United States Patent [19]
Brazis et al.

[11] Patent Number: 5,203,836
[45] Date of Patent: Apr. 20, 1993

[54] NESTABLE MIXING BOWL WITH INTEGRAL HANDLE

[75] Inventors: William E. Brazis; David L. Feer, both of Medina, Ohio

[73] Assignee: Rubbermaid Incorporated, Wooster, Ohio

[21] Appl. No.: 819,055

[22] Filed: Jan. 10, 1992

[51] Int. Cl.$^5$ ............................................. B65D 21/00
[52] U.S. Cl. .................... 206/507; 220/23.83; 220/574; 220/657; 220/659; 220/755; 220/771; 222/143; 222/465.1; D7/543
[58] Field of Search ...................... 220/574, 23.83, 657, 220/659, 675, 94 A, 514, 755, 758, 768, 769, 771; 206/505, 507, 514, 515; D7/543, 545, 546; 222/143, 465.1

[56] References Cited

U.S. PATENT DOCUMENTS

| | | | |
|---|---|---|---|
| D. 166,934 | 6/1952 | Slobodkin | D7/543 |
| D. 167,166 | 7/1952 | Rodier | D7/543 X |
| D. 170,735 | 10/1953 | Zeisel | D7/543 |
| 421,264 | 2/1890 | Gibbons | 220/23.83 X |
| 2,412,325 | 12/1946 | Devine et al. | 220/23.83 X |
| 3,526,138 | 9/1970 | Swett et al. | 206/514 X |
| 4,204,609 | 5/1980 | Kuhn | 220/408 |
| 4,951,832 | 8/1990 | Tenney et al. | 220/23.83 |

FOREIGN PATENT DOCUMENTS 2136271  9/1984  United Kingdom ................. D7/543

OTHER PUBLICATIONS p. 20, Mixing Bowl, Tucker Housewares, 25 Tucker Drive, Leominster, Mass. 01469. Publication date 1986.
Sell Sheet, Mixing Bowl, Tucker Housewares, 25 Tucker Drive, Leominster, Mass. 01469. Publication date 1989.
Sell Sheet, Mixing Bowl Set, Modern Plastics, 6525 Picard, St. Hyacinthe, Quebec, Canada J2S 1H3. Publication date Jan. 1991.
Catalog Page, Mixing Bowls, Tupperware, P.O. Box 2353, Orlando, Fla. 32802. Publication date 1989.
Catalog Page, Bowl Set, Crown Corning, Corning Inc., Houghton Park, Corning, New York 14830. Publication date Fall, 1988.
Catalog Page, Bowl, Crown Corning, Corning Inc., Houghton Park, Corning, New York 14830. Publication date Fall, 1988.
p. 34, Mixing Bowl, Corning Revere, Corning Inc., Houghton Park, Corning, New York 14830. Publication date 1990.
Catalog Page, Mixing Bowl, Dupol-Rubbermaid, GmbH, An der Trift 63, D-6072 Dreieich, Germany. Publication date 1975.
p. 14, Mixing Bowls, Dupol-Rubbermaid, GmbH, An der Trift 63, D-6072 Dreieich, Germany. Publication date 1985.
p. 16, Mixing Bowl, Rubbermaid Incorporated, Housewares Products Division, 1147 Akron Road, Wooster, Ohio 44691. Publication date 1986.
p. 16, Bowls, Rubbermaid Incorporated, Housewares Products Division, 1147 Akron Road, Wooster, Ohio 44691. Publication date 1990.

*Primary Examiner*—Allan N. Shoap
*Assistant Examiner*—Stephen Cronin
*Attorney, Agent, or Firm*—Richard B. O'Planick

[57] ABSTRACT

A mixing bowl set is disclosed comprising nestable bowls (2,4), each having a radiussed sidewalls (8), and a downturned upper rim flange (14). The rim flange (14) has a lower edge 20 which is spaced apart from the sidewall (8) a distance which varies from a maximun at the rearward end (24) of the bowl to a minimum at the forward end (26). Accordingly, a channel (22) is defined below the rim flange (14) which is wider at the rearward end, sufficiently so to admit the digits of a hand, whereby making the rearward portion of the flange (14) a handle for the bowl. A pourspout (28) is provided in the forward end of the rim flange (14) and is configured to be entirely below flange (14). Accordingly, there are no projections beyond the rim flange of the bowl throughout its entire circumference which could interfere with the nesting of one bowl into a like-configured larger bowl.

16 Claims, 5 Drawing Sheets

NESTABLE MIXING BOWL WITH INTEGRAL HANDLE

BACKGROUND OF THE INVENTION

1. Field of the Invention

The present relates generally to bowls for use in the preparation of food, and specifically to mixing bowl sets in which individual bowls nest within one another for space-efficient storage.

2. The Prior Art

Mixing bowls are commonly used in the preparation of food, whether for commercial or domestic consumption. Typically, such bowls are sold as a set, comprised of differently sized bowls. Also typically, the bowls are nestable, in that the smallest bowl fits into the next smallest, etc., such that the entire set may be stored inside the largest of the bowls. This facility enables the set to occupy the least amount of space in storage.

Generally, commercially available mixing bowls are conventionally molded of conventional plastic material. The bowls are of circular cross-section, with the sidewall of a bowl extending from a bottom surface to a top edge. The bowl is used to mix together various food ingredients, of liquid or granular form. Upon mixing the ingredients together, the combination is poured into a baking pan or the like. Accordingly, conventional bowls may provide a pourspout extending outwardly from one end. To extract the bowl contents by wa of the spout, the bowl rim is grasped at the end opposite the spout and the bowl is thereby tipped until the contents exit through the spout.

While available mixing bowl configurations are utilitarian, and function according to design, certain shortcomings prevent them from ideally satisfying all of a user s needs. First, grasping a full mixing bowl by the upper rim, in order to pour out the contents, is extremely arduous and requires substantial finger strength. Elderly, and those of lesser strength, therefore, find the use of such bowls cumbersome.

Simply the addition of a handle to the side of the bowl opposite the pourspout will not suffice since the handle would either impede, or render impossible, the nesting of one container within another. Similarly, an outward projecting pourspout can interfere with the nesting of conventional bowls as well. For this reason, nesting bowl sets are either nestable, in which case the bowls lack a pour spout and handle, or the sets are comprised of bowls which have a pourspout and handle, but which are not mutually nestable.

SUMMARY OF THE INVENTION

The present invention overcomes the aforementioned shortcomings of commercially available mixing bowl sets, by providing a mixing bowl which nests, and which provides an integral handle and pourspout. The bowls in the set are configured to have a bottom surface, radiused sides, and a downturned rim flange extending outwardly and downward from the top rim of the bowl. A pourspout is integrally formed in the rim flange at a forward end of the bowl, and lies beneath, and completely covered by, the downturned rim flange. So positioned, the pourspout cannot interfere with the nesting of one bowl within another.

The downturned rim flange is further adapted to project outwardly from the sides of the bowl a distance which increases from the pourspout at the front to a maximum spacing at the rear of the bowl. The channel formed at the rear of the bowl, opposite the pourspout, by the downturned flange and the bowl sidewall, being at its maximum width, will easily receive the digits of a hand, whereby enabling a user to conveniently grasp the rearward portion of the downturned rim flange. Tipping the bowl, by way of the integrally formed handle represented by the rearward portion of the downturned rim flange is readily facilitated. A flat portion is provided in the top of the downturned rim flange as a resting surface for a user's thumb, further enhancing the comfort of the bowls in use.

Moreover, the integral incorporation of a handle into the downturned rim flange, again, does not interfere with the nesting of on bowl within another.

Accordingly, it is an objective of the present invention to provide a nesting mixing bowl having an integral pourspout and handle.

Yet a further objective is to provide a nesting mixing bowl in which the handle and pourspout lie within the confines described by an upper rim of the bowl.

Still a further objective is to provide a mixing bowl having a handle and pourspout which do not interfere with the nesting of the bowl into a like-configured larger bowl.

Another objective of the present invention is to provide a mixing bowl having a handle which is comfortable and convenient to use.

Yet another objective is to provide a mixing bowl having a relatively drip-proof spout by which to pour out contents of the bowl.

Another objective is to provide a mixing bowl which can be economically and conveniently manufactured from conventional plastic material by conventional processes.

These, and other objectives, which will be apparent to those skilled in the art, are achieved by a preferred embodiment which is described in detail below and which is illustrated by the accompanying drawings.

DESCRIPTION OF THE PREFERRED EMBODIMENT

Figure 1:
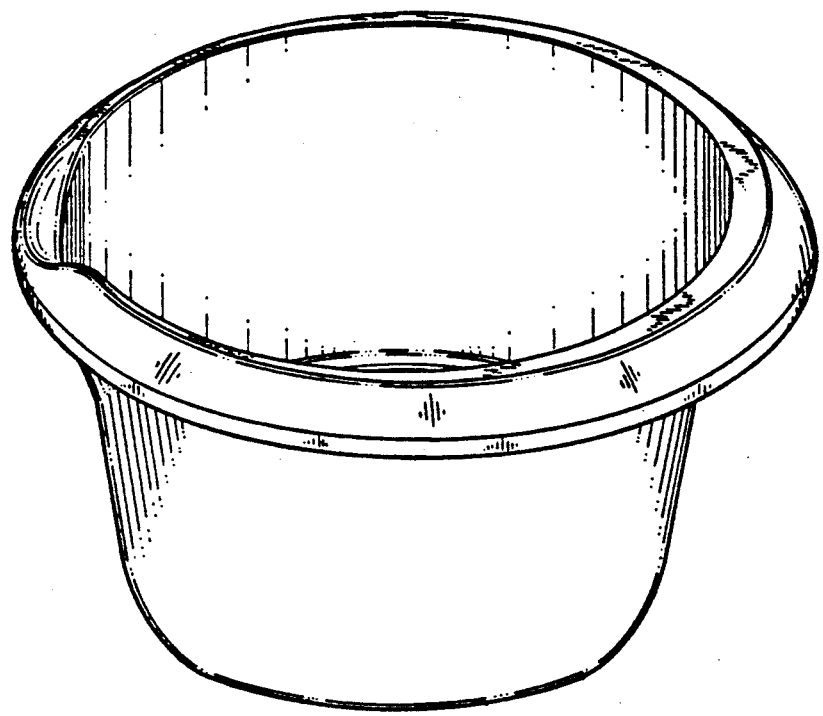
FIG. 1 is a front perspective view of the subject mixing bowl.
Figure 9:
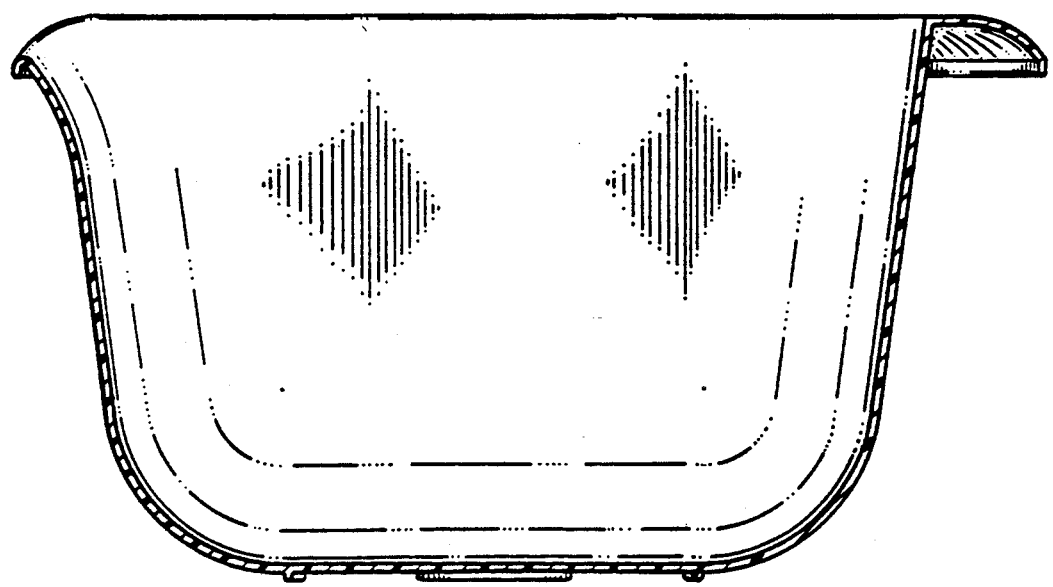
FIG. 9 is a transverse section view through the subject mixing bowl.
Figure 2:
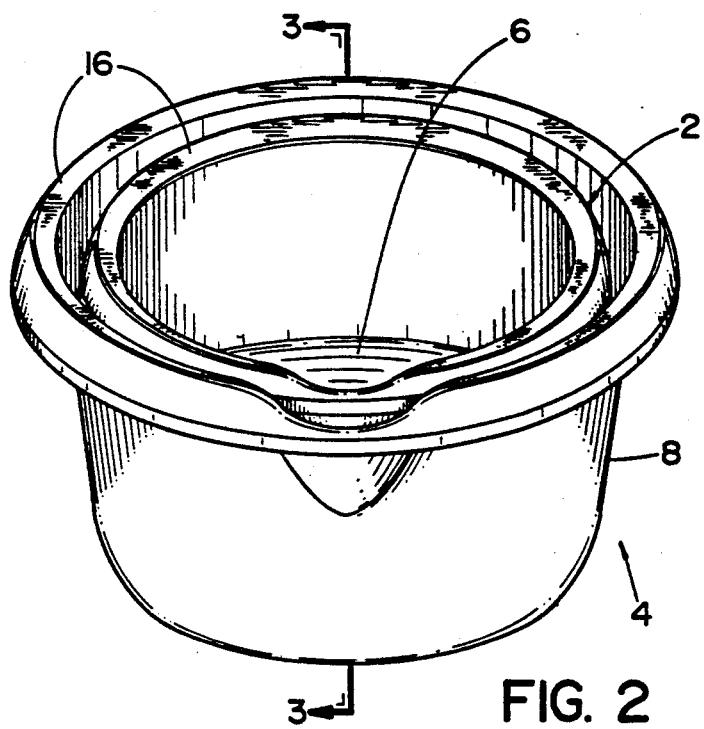
FIG. 2 is a front perspective view of the bowl set shown in the nested condition.
Figure 3:
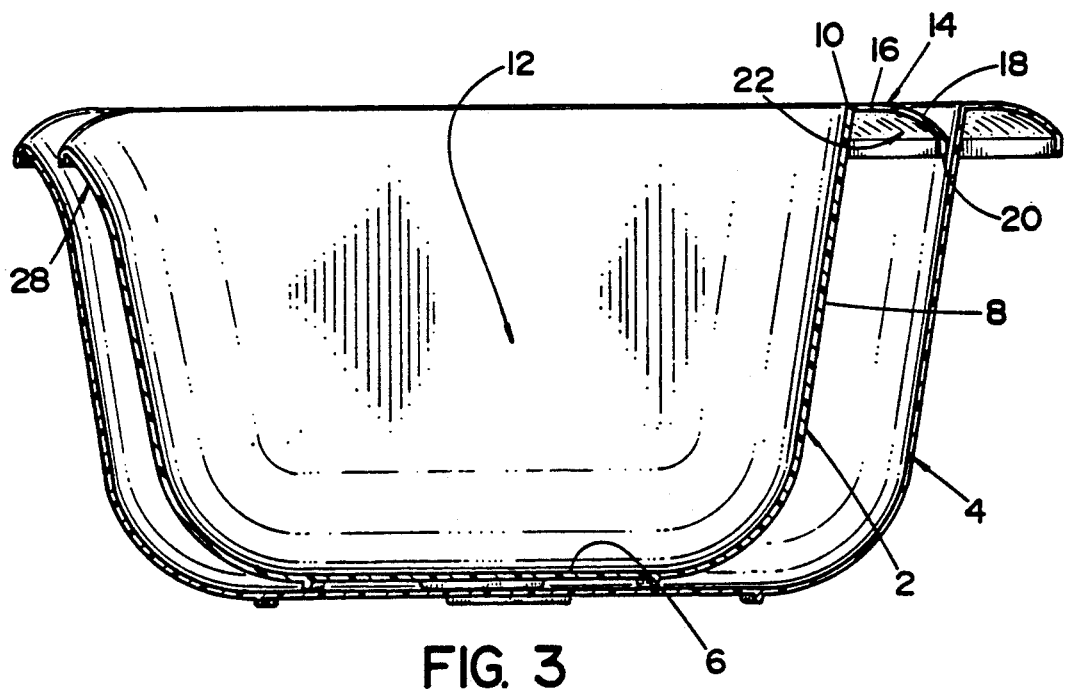
FIG. 3 is a transverse section view through the nested bowl set shown in FIG. 2, taken along the line 3—3.

Referring first to FIGS. 1 and 3, the subject mixing bowl set is shown to comprise two or more bowls of equivalent construction, differing only in size. The two bowls 2,4 are injection molded of typical plastic material, such as polypropylene. As shown, the bowl 2 is of generally circular horizontal cross-section and is formed having a bottom surface 6, and a radiused sidewall 8 extending from the bottom surface 6 to an upper bowl rim 10. An internal volume 12 is thereby defined.

A downturned rim flange 14 is provided along the upper rim 10, and comprises a flat, or horizontal inward portion 16 and a downwardly concave outward portion 18. The concave portion 18 terminates at a lower edge 20.

Figure 6:
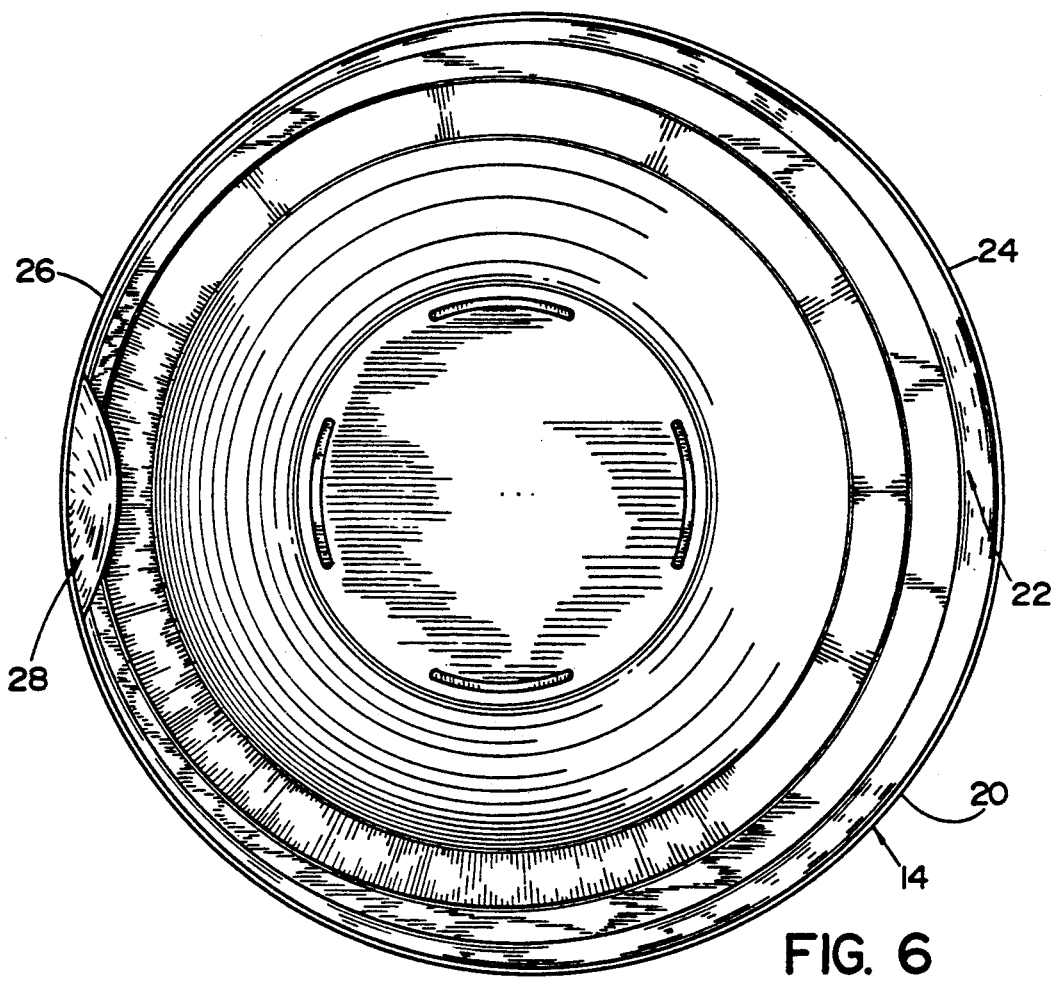
FIG. 6 is a bottom plan view of the subject bowl.
Figure 7:
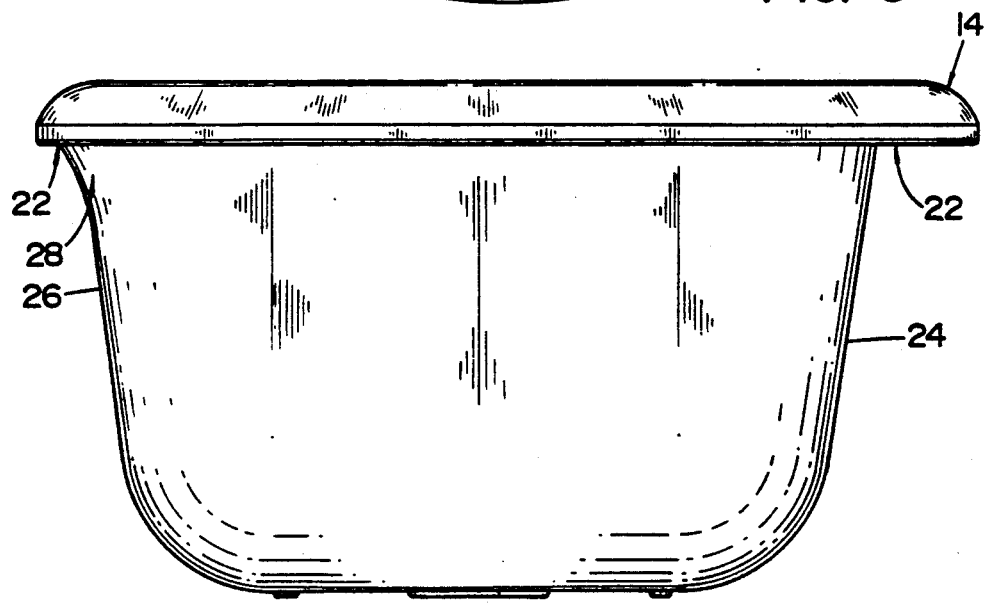
FIG. 7 is a side elevational view of the subject bowl.
Figure 8:
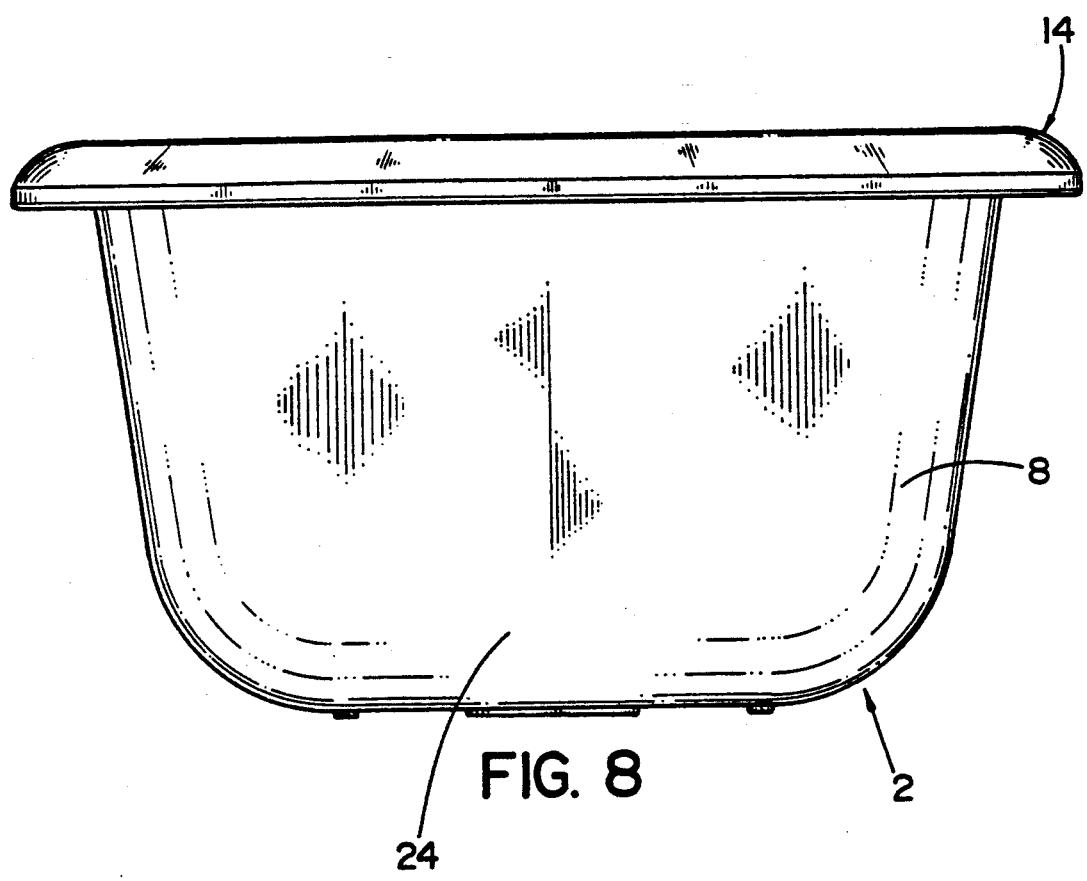
FIG. 8 is a rear elevational view of the subject bowl.

The rim flange 14, in combination with the upper portions of the sidewall 8 define a channel 22, which circumscribes the bowl from a rearward end 24 to a forward bowl end 26, best seen in FIG. 7. Further, the channel 22 increases in width from the forward end 26 to the rearward end as seen from FIGS. 3 and 7. The overhang of the rim flange 14 is greatest at the rearward of the bowl and least at the forward end, as will be appreciated from the bottom plan view of FIG. 6.

Stated alternatively, the lower edge 20 of the downturned rim flange 14 is spaced from the sidewall 8 of the container a distance which increases from the forward end 26 of the bowl to a rearward end 24. The channel 22 at the rearward end is thus of sufficient width to comfortably receive the digits of a hand, whereby enabling a user to support the rearward portion of the rim flange as a handle. The thumb of the user's hand may be conveniently rested upon the flat portion 16 of the rim flange 14 at the rearward end of the bowl, which, is likewise of maximum width at that end. See FIG. 4. Supporting the downturned rim flange as a handle is superior to the prior art, which requires that the bowl rim be pinched from above and thereby lifted.

Figure 4:
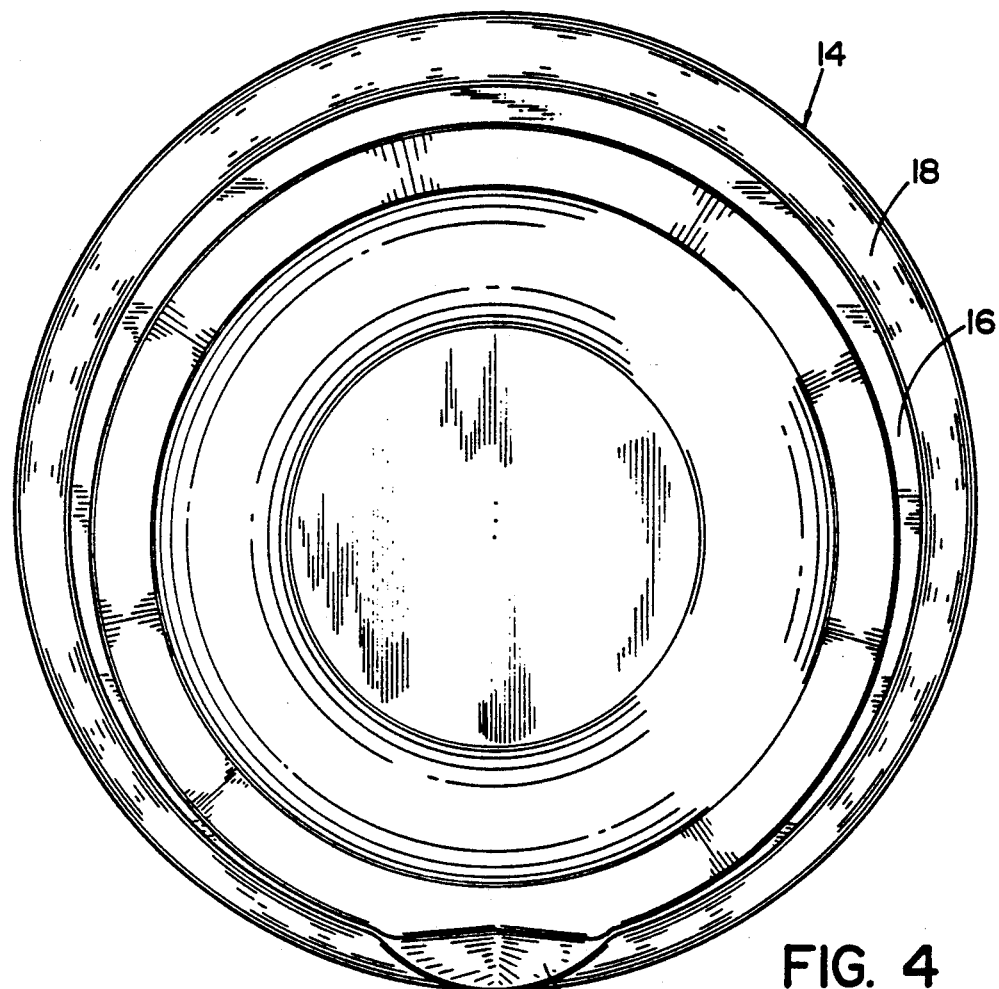
FIG. 4 is a top plan view of a bowl from the set.
Figure 5:
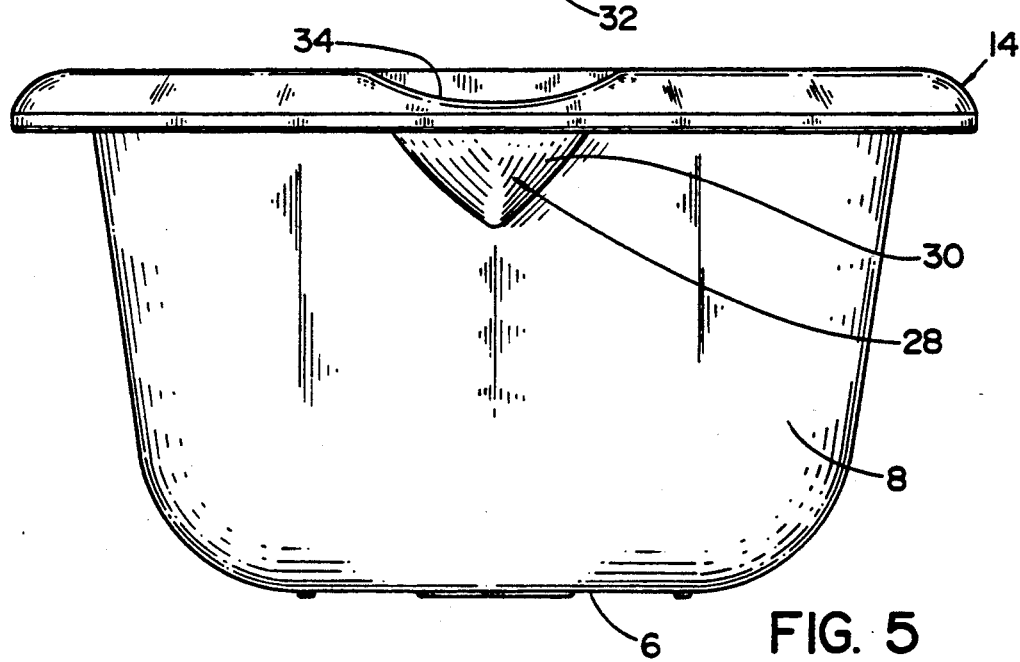
FIG. 5 is a front elevational view of the subject bowl.

Referring to FIGS. 4, 5, and 7, a pourspout 28 is further provided to within the forward portion of the rim flange 14. The pourspout 28 has a concave exterior surface 30 and an inner surface 32. Surfaces 30, 32 taper from top to bottom as shown. The inner surface 32 terminates at a top spout edge 34, which is arcuate in form, and which is recessed below the top of the rim flange 14. Further, as shown best by FIGS. 6 and 7, the entire pourspout 28 lies within the outline of the bowl, defined by the rim flange edge 20. In other words, the pourspout concave surface 30 lies beneath the rim flange 14, and does not project beyond the lower edge 20 thereof. This enables the bowl to nest within a larger bowl, as shown by FIG. 3, without interference.

From FIG. 3 it will be appreciated that nested bowls may be conveniently stored. While only two bowls are shown, other sizes may be included into a set. It will further be observed that the handle, represented by the rearward portion of the rim flange 14, does not protrude beyond the outer extremity of the rim flange, and therefore does not interfere with the nesting of the bowls. Furthermore, the integral handle enables the user to support the bowl when lifting, and pour out of the pourspout at the opposite bowl end. Still furthermore, it will be seen from FIG. 3 that, in the nested condition, the upper edges of the bowls are coplanar, further facilitating their convenient storage.

While the above constitutes the preferred embodiment of the present invention, the invention is not to be so confined. Other embodiments, which utilize the teachings herein set forth, are intended to be within the scope and spirit of the invention.

We claim:

1. A bowl of the type having a bottom surface, a radiused sidewall extending upward from said bottom surface to a top bowl rim, and a pourspout formed in said top rim at a forward side of the bowl, the improvement comprising:
said bowl having a downturned rim flange at said top bowl rim, said rim flange extending continuously about said top bowl rim in dependence therefrom and terminating at a lower edge, said lower edge having a constant spacing from said top bowl rim about the perimeter of said bowl, and said rim flange defining with upper portions of the bowl sidewall a channel extending along said bowl rim, said channel having a relatively narrow width dimension at the forward side of the bowl, and a relatively large width dimension at a rearward side of the bowl, whereby a rearward portion of said rim flange forming a handle at the rearward side of the bowl.

2. A bowl according to claim 1, wherein said downturned rim flange having a downwardly concave, outwardly directed surface, extending continuously along said bowl rim.

3. A bowl according to claim 2, wherein said channel width at the rearward side of the bowl being sufficient to admit the digits of a hand, whereby enabling a user to grip the rearward rim flange portion.

4. A bowl according to claim 3, wherein said bowl pourspout extending into a forward portion of said rim flange.

5. A bowl according to claim 4, wherein said bowl pourspout tapering in width from said bowl rim toward said bowl bottom surface, and having a sidewall extending outward from said bowl sidewall.

6. A bowl according to claim 5, wherein said bowl pourspout sidewall is positioned beneath said rim flange forward portion.

7. A bowl according to claim 6, wherein said rim flange having an inward horizontal portion extending from said bowl rim outward, said horizontal rim flange portion having a relatively narrow width dimension at said forward bowl side and a relatively wide width dimension at said rearward bowl side.

8. A bowl according to claim 7, said bowl nesting within a like-configured second bowl, of larger capacity, such that the upper rims of said bowl and said second bowl being in coplanar relationship.

9. A bowl of the type having a bottom surface, a radiused sidewall extending upward from said bottom surface to a top bowl rim and defining with the bottom surface an upwardly open receptacle, and a pourspout formed in said top rim at a forward side of the bowl, the improvement comprising:
said bowl having a downturned rim flange extending continuously along said bowl top rim, said flange having a continuous dependent terminal edge spaced apart from the sidewall of the bowl an increasing distance from the pourspout to a rearward side of the bowl, said terminal flange edge having a constant spacing from said bowl top rim about the perimeter of said bowl.

10. A bowl according to claim 9, wherein the pourspout tapering in width from the bowl rim toward the bowl bottom surface, and having a concave outer surface extending outward from the bowl sidewall.

11. A bowl according to claim 10, wherein the pourspout concave surface lies beneath the downturned rim flange.

12. A bowl according to claim 11, wherein the downturned rim flange having a downwardly concave outer surface, which terminates at said terminal edge.

13. A bowl according to claim 12, wherein a rim flange portion at said rearward side of the bowl defining with said bowl sidewall a channel of sufficient width to admit the digits of a hand, whereby enabling a user to grip the rearward rim flange portion as a handle.

14. A bowl according to claim 13, wherein the rim flange having an inward horizontal portion extending outwardly from the bowl rim, the horizontal portion being of increasing width from the pourspout to said rearward bowl side.

15. A bowl according to claim 9, wherein a rim flange portion at said rearward side of the bowl defining with said bowl sidewall a channel of sufficient width to admit the digits of a hand, whereby enabling a user to grip the rearward rim flange portion as a handle.

16. A bowl according to claim 15, wherein the rim flange having an inward horizontal surface portion between said bowl rim and said concave outer surface, said horizontal surface portion being of increasing width from the pourspout to said rearward bowl side.

* * * * *